United States Patent
Zhao et al.

(10) Patent No.: US 8,016,899 B2
(45) Date of Patent: Sep. 13, 2011

(54) COMPOSITE FUELS FOR HYDROGEN GENERATION

(75) Inventors: Qingjun Zhao, El Dorado Hills, CA (US); Yuyan Luo, El Dorado Hills, CA (US)

(73) Assignee: Eion Energy Corporation, El Dorado Hills, CA (US)

( * ) Notice: Subject to any disclaimer, the term of this patent is extended or adjusted under 35 U.S.C. 154(b) by 1061 days.

(21) Appl. No.: 11/709,349

(22) Filed: Feb. 20, 2007

(65) Prior Publication Data

US 2007/0194273 A1 Aug. 23, 2007

Related U.S. Application Data

(60) Provisional application No. 60/774,874, filed on Feb. 18, 2006.

(51) Int. Cl.
*C10L 1/12* (2006.01)
(52) U.S. Cl. ............. 44/457; 252/182.12; 252/182.32; 252/183.13
(58) Field of Classification Search .......... 44/436, 44/437, 439, 457, 385, 445, 447, 448, 451; 252/182.12, 182.32, 183.13
See application file for complete search history.

(56) References Cited

U.S. PATENT DOCUMENTS

| 5,904,913 | A | 5/1999 | Bohm et al. |
| 6,534,033 | B1 | 3/2003 | Amendola et al. |
| 6,554,877 | B2 | 4/2003 | Finkelshtain |
| 6,699,457 | B2 | 3/2004 | Cortright et al. |
| 6,890,419 | B2 | 5/2005 | Reichman |
| 2003/0099593 | A1 | 5/2003 | Cortright et al. |
| 2003/0157018 | A1* | 8/2003 | Zaluski et al. ............. 423/648.1 |
| 2006/0018824 | A1 | 1/2006 | Reichman et al. |

FOREIGN PATENT DOCUMENTS

EP 1 284 922 2/2005

OTHER PUBLICATIONS

International Search Report dated Mar. 31, 2008 issued in corresponding PCT/US2007/04360.

* cited by examiner

*Primary Examiner* — Cephia D Toomer
(74) *Attorney, Agent, or Firm* — David H. Jaffer; Pillsbury Winthrop Shaw Pittmann LLP

(57) ABSTRACT

Composite fuels for hydrogen generation include materials that endothermically release hydrogen, materials that exothermically release hydrogen, and additives to promote endothermic reaction and to inhibit exothermic reaction.

30 Claims, 2 Drawing Sheets

COMPOSITE FUELS FOR HYDROGEN GENERATION

RELATED APPLICATION

This application claims the benefit of U.S. Provisional Patent Application Ser. No. 60/774,874 filed Feb. 18, 2006.

BACKGROUND OF THE INVENTION

1. Field of Invention

Composite fuels that can be converted to hydrogen include materials that endothermically release hydrogen, materials that exothermically release hydrogen, and additives to promote endothermic reaction and to inhibit exothermic reaction.

2. Description of the Related Art

Hydrogen is considered a future fuel for the globe. It contains high energy, enables high energy conversion efficiency, and is environmentally benign. Hydrogen enabled fuel cell power could be widely used for transportation, stationary, and portable power applications. Through a fuel cell device, hydrogen fuel electrochemically combines with oxygen from air to generate power with heat, and leaves water as the only exhaust. But hydrogen must be extracted or made from hydrogen-containing materials, such as water and hydrocarbons, or from synthesized chemicals like hydrides and alcohols. Issues from hydrogen production, storage and transportation have slowed down the realization of a hydrogen economy. To compete with existing hydrocarbon energy or batteries, these issues have to be resolved. One of the solutions is to develop technologies that enable hydrogen production at the point of applications in the quantity needed. With such a technology, there will be no needs to store and transport hydrogen.

The primary fuel selected to generate hydrogen plays a very important role in system energy efficiency and cost. U.S. Pat. No. 5,904,913 teaches a method to generate hydrogen from methanol. A mixture of methanol and water serves as the fuel to generate hydrogen in a steaming reformer in accordance with the following reaction:

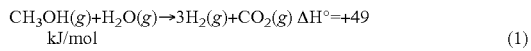

$$CH_3OH(g)+H_2O(g)\rightarrow 3H_2(g)+CO_2(g) \;\Delta H°=+49 \text{ kJ/mol} \quad (1)$$

Since this is an endothermic reaction, a large amount of heat energy is needed to maintain the reaction (over 300° C. even in the presence of catalysts). Furthermore, at such a high temperature methanol fuel also decomposes into carbon monoxide:

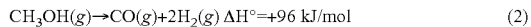

$$CH_3OH(g)\rightarrow CO(g)+2H_2(g) \;\Delta H°=+96 \text{ kJ/mol} \quad (2)$$

This reaction takes more thermal energy than reforming reaction (1) and also releases poisonous carbon monoxide. The presence of carbon dioxide and carbon monoxide in the product gas stream will greatly reduce the value of this process for low temperature fuel cells, such as alkaline fuel cells (AFC) and polymer electrolyte membrane fuel cells (PEMFC). Several stages of treatment and separation of the product stream are needed before piping the hydrogen product into fuel cell devices. These treatments further reduce energy efficiency, add cost, and make the system very bulky and complex, which greatly limits its application. In addition of these problems, using methanol as the primary fuel also leads to the risk of exposure of methanol vapor at high temperature, creating safety concerns, especially for portable power applications.

U.S. Pat. No. 6,699,457 discloses a low temperature hydrogen production method using oxygenated hydrocarbon fuels, such as sugar and glucose. These fuels are reformed in liquid phase in the presence of catalysts, which helps to save some energy because there is no need to vaporize the fuel. However, a temperature of 300° C. for most of the fuels mentioned in the disclosure still must be maintained by an external heat source. Because of the slow kinetics of reforming these fuels, a large catalyst package is required, which limits application of the process to stationary fuel cell power. The presence of carbon dioxide in the product steam also requires separation for specific applications, such as alkaline fuel cell power generation. Because the process temperature is much higher than the boiling point of water, a high pressure vessel is needed to conduct liquid phase reforming, greatly reducing the gravimetric energy density of the system and creating safety concerns for portable power applications.

U.S. Pat. No. 6,534,033 discloses another way to generate hydrogen, using sodium borohydride at a lower temperature. The fuel used in this approach is a mixture of 20 wt % sodium borohydride and 3 wt % sodium hydroxide, with the rest water. When hydrogen is needed, the fuel mixture is pumped into a catalyst bed and sodium borohydride is hydrolyzed on the surface of promoting catalysts. The hydrolysis of sodium borohydride is represented as follows:

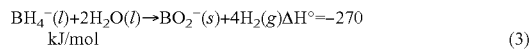

$$BH_4^-(l)+2H_2O(l)\rightarrow BO_2^-(s)+4H_2(g) \;\Delta H°=-270 \text{ kJ/mol} \quad (3)$$

If proper catalysts are used, this hydrolysis reaction will spontaneously take place. The fuel does not generate harmful vapors. However, this process generates a lot of waste heat and drives the temperature of the fuel processor up to 200° C., which causes rapid loss of water vapor and leaves a solid by-product (sodium borate) in the catalyst bed. A cooling system or extra energy is needed to remove this waste heat. Furthermore, sodium hydroxide in this fuel mixture serves as a stabilizer to prevent the hydrolysis of sodium borohydride solution during storage. In order to have adequate shelf storage time in practice, sodium hydroxide with a concentration of up to 40 wt % is needed. The extra alkali materials reduce the fuel energy density, increase fuel cost, and create environmental risk upon disposal of the fuel cartridge. Another problem with this fuel is its freezing point. The fuel storage container or cartridge can only be used at temperatures above 0° C. or even above 18° C. This problem limits its application to areas with warm climates. However, hydrogen enabled fuel cell power is often needed at temperatures of −20° C. or even lower.

The prior art is focused on methods to process a single primary fuel to generate hydrogen, but fails to make hydrogen generation simple and more energy efficient. There remains a need to develop fuels and corresponding processing methods to generate hydrogen on-demand at the point of application. A primary fuel for hydrogen generation should have the following: (a) the cost of fuel should be low; (b) the fuel should be very stable at a wide range of climatic conditions; (c) there should be no chemical decomposition or change of physical form during the storage time; (d) the fuel should require minimum energy to be processed or to achieve high-energy efficiency; (e) when the fuel is processed, there should be no harmful gases produced; (f) pure hydrogen should be produced in a single, simple step; and (g) the gravimetric and volumetric energy density of the fuel should be high.

SUMMARY OF THE INVENTION

The present invention relates to composite fuels that can be chemically or electrochemically converted to hydrogen fuel for hydrogen fuel cell applications or general hydrogen usage. These composite fuels include materials with high and low free energy that release hydrogen in endothermic and exothermic paths. The composite fuels also contain ingredients to be added or generated in-situ as promoters for endothermic reactions and inhibitors for exothermic reactions. These composite fuels are in the forms of solid, suspension, or solution.

The low free energy ingredients in the composite fuels may be selected from organics and their related salts, such as hydrocarbons and oxygenated hydrocarbons as well as their related salts. Suitable ingredients with high free energy include metals, metal hydrides, and chemical hydrides, individually or in mixtures.

The promoters for endothermic reactions of low free energy ingredients and inhibitors for exothermic reactions of high free energy ingredients include inorganic hydroxides, metal alkoxides, and/or other organic bases, which may be added or produced in-situ from the group of ingredients with high free energy.

In one of the embodiment, the composite fuel is mixed with catalysts and polymers in a "dry" state. When hydrogen is needed, water is fed into the fuel container or cartridge at a controlled rate.

In another embodiment, the composite fuel is balanced with water and a clear solution or suspension can be produced. When hydrogen is needed, the composite fuel solution or suspension is pumped, squeezed or diffused into a catalytic or electrocatalytic processor, where the composite fuel is converted to hydrogen.

One of the advantages of these composite fuels is their high hydrogen content, which leads to high gravimetric and volumetric energy density for fuel cell power systems.

Another advantage of these composite fuels is that they generate pure hydrogen in a single step. No greenhouse gases or other gas phase impurities are generated, so the hydrogen product need not be further cleaned. This reduces the complexity, cost, and size of a power system.

The composite fuels require minimal energy to extract hydrogen. Thus, a power system using this hydrogen generation mechanism has higher energy efficiency. Hydrogen can be generated from these composite fuels at temperature well below 200° C. The low operating temperature is beneficial to the integration of power products. The fuels are stable in a wide range climatic conditions, are safe for storage, and have a long shelf life. All the residues of hydrogen generation with these fuels are environmentally safe. The present invention provides primary composite fuels that enable efficient generation of hydrogen on demand and on-spot. The fuel ingredients are optimized to ensure high energy density, economy, and stability in wide climatic and storage conditions.

DETAILED DESCRIPTION OF INVENTION

Figure 1:
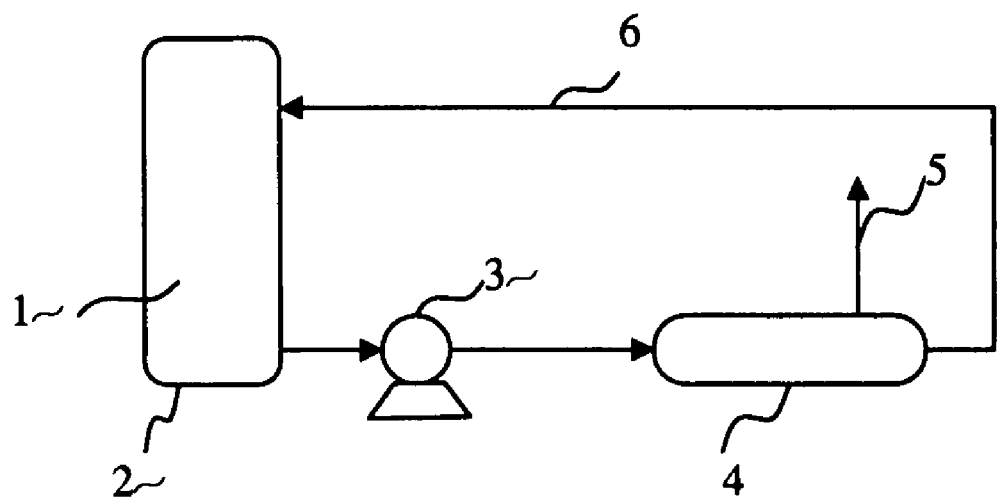
FIG. 1 is a schematic drawing showing hydrogen generation by feeding the composite fuel into a catalytic or electrocatalytic fuel processor.

The present invention provides composite fuels for on-demand hydrogen generation at the application point. The composite fuels resolve storage and distribution issues for hydrogen gas and meet the urgent need of hydrogen fuel for hydrogen enabled fuel cell power generation. Compared to the prior art of hydrogen generation technologies using hydrocarbons or oxygenated hydrocarbons, the composite fuels of the present invention can be processed to hydrogen at much lower temperature, which enhances the energy efficiency of the system and reduces the capital and operating costs. Composed with the prior art using inorganic hydrides to generate hydrogen, the composite fuel of the present invention is stable, efficient, and has higher hydrogen content.

These advantages are realized by selecting synergetic ingredients that have high hydrogen content, promote dehydrogenation, absorb gas products other than hydrogen, and stabilize the fuel compositions in storage.

In the present invention, one of the ingredients in the composite fuel is an organic with low free energy, such as hydrocarbons or oxygenated hydrocarbons, or organic salts.

Hydrocarbons with unsaturated bonds are active fuels for hydrogen generation. With specific catalysts or electrocatalysts and in the presence of water, these fuels can be reformed into hydrogen.

Oxygenated hydrocarbons, such as methanol, ethanol, ethylene glycol, glycerol and the like, are partial oxidized hydrocarbons and can be further catalytically reformed with water to generated hydrogen. At elevated temperatures, they can react with water in the presence of catalysts, such as Cu/ZnO or supported noble metals, to generate hydrogen. For example, methanol is the product of partial oxidation of methane and it can be further oxidized to carbon dioxide, represented above in equation (1).

In most cases, the reactions of these organic molecules are endothermic and the kinetics of these reactions is quite slow. Reforming hydrocarbons and oxygenated hydrocarbons require a great amount of heat energy for startup and to maintain the reactions at an acceptable rate. Depending on the type of organic fuels, operating temperatures over 300° C. or even 600° C. are needed for conversion to hydrogen.

These organic fuels can also be converted to hydrogen by an electrochemical method. In the presence of an electrolyte and electrocatalysts, these fuels can be oxidized to assist the reduction of water to form hydrogen. For example, in an electrochemical cell with an anode, a cathode and electrolyte, methanol can be oxidized at the anode to carbon dioxide and water is reduced to hydrogen at the cathode. In an acidic media, these reactions are represented as follows:

Oxidation at Anode:

$$CH_3OH(l) + H_2O(l) - 6e^- \rightarrow 6H^+(l) + CO_2(g) \qquad (4)$$

Reduction at Cathode:

$$6H^+(l) \rightarrow 3H_2(g) \qquad (5)$$

Total Reaction:

$$CH_3OH(l) + H_2O(l) \rightarrow 3H_2(g) + CO_2(g) \qquad (6)$$

$$E^\circ = -0.046 \text{ V}$$

$$\Delta H^\circ = +131.5 \text{ kJ/mol}$$

There are two significant advantages of electrochemical reforming of organic water solutions: (a) the voltage (for methanol: $E^\circ \geq 0.046$) needed to drive these reactions is much lower than electrolysis of water ($E^\circ \geq 1.23V$), and (b) the reactions can take place at much lower temperature than catalytic reforming. However, the need of electrical energy limits this method for many applications, such as portable or remote hydrogen needs.

According to reactions (4) and (5), these reactions are pH dependent. If alkaline media is used instead of an acidic one, the following electrochemical reactions take place:

Oxidation at Anode:

$$CH_3OH(l) + 8OH^-(l) - 6e^- \rightarrow 6H_2O(l) + CO_3^=(l) \quad (7)$$

Reduction at Cathode:

$$6H_2O(l) \rightarrow 3H_2(g) + 6OH^-(g) \quad (8)$$

Total Reaction:

$$CH_3OH(l) + 2OH^-(l) \rightarrow 3H_2(g) + CO_3^=(g) \quad (9)$$

$$E^\circ = +0.072 \text{ V}$$

$$\Delta H^\circ = +22.1 \text{ kJ/mol}$$

By operating in alkaline media, several advantages are realized. One of the advantages is that hydrogen generation becomes thermodynamically spontaneous at standard conditions. Another advantage is that the heat energy needed is six times less than in the acidic media. Yet another advantage is that carbon dioxide is absorbed by the hydroxide, and hydrogen becomes the only gaseous product, which simplifies the post-reaction treatment of the product. Another advantage is that the reaction kinetics of oxidation of organic molecules in alkaline media is much better more favorable than in acidic media.

Theoretically, in an alkaline solution the electrochemical reforming of organics, such as methanol, can take place automatically at room temperature and so there is no need to apply electric energy because $E^\circ > 0$. The spontaneity of electrochemical reforming of organics to hydrogen in alkaline media can be further increased by increasing the operating temperature and the concentration of hydroxides. Under these conditions, the electrochemical reforming takes place like a shorted corrosion cell if appropriate electrocatalysts are in presence.

Thus, an energy-efficient way to convert a hydrocarbon or an oxygenated hydrocarbon to generate hydrogen is by electrochemical reforming in a high pH media. Accordingly, a fuel with organics and hydroxides mixed together can be converted to hydrogen by a simple electrochemical reforming mechanism. The electrochemical reforming can take place like a corrosion cell where organics are oxidized (corroded) and water is reduced to hydrogen on a micro or even a nano scale. The hydroxide serves as a promoter for these reactions and is consumed in the process and can be considered as part of the fuel.

In the present invention, a composite fuel containing organics and hydroxide is converted to hydrogen by an endothermic electrochemical reaction in the presence of water. In one of the embodiments of the present invention, the hydroxide, such as lithium hydroxide, potassium hydroxide and/or sodium hydroxide or their mixtures, is added in a water solution to make the composite fuels in the liquid form. The concentration of hydroxide is between 1 to 50 wt %. It is preferred that the concentration of hydroxide be in a stoichiometric mole ratio to the organic fuels based on the reactions.

The composite fuel of the present invention also contains other fuels that will release heat to meet the thermal energy need of the organics discussed above. Thus, the composite fuel contains chemical ingredients that can be exothermally converted to hydrogen, with the released thermal energy instantly contributed to the needs of converting organics.

Chemical ingredients that release heat when hydrogen is extracted include chemical hydrides that are stable in the aqueous mixture. One example is borohydride. With selected catalysts, borohydrides can be hydrolyzed to hydrogen in the presence of water. The reaction can be represented as the following:

$$MBH_4 + 2H_2O \rightarrow MBO_2 + 4H_2 \quad \Delta H^\circ << 0 \quad (10)$$

where M is an alkali or alkaline-earth metal. The hydrolysis of borohydride is exothermic. For example, hydrolysis of one mole of sodium borohydride ($NaBH_4$) will release 270 KJ heat. This vast amount of heat has usually been considered a problem in its use as a hydrogen source. However, in the present invention, it becomes beneficial because the heat is used to convert the organic component to hydrogen.

In the present invention, the amount of borohydride added into the composite liquid fuel is determined by identifying the thermal requirements to convert the organic ingredients and the desired temperature of a hydrogen generator. The mole ratio of borohydride to organic component varies from 0.1 to 2, and preferably from 0.2 to 1.5.

In the prior art, an additive has to be added to a mixture of borohydride and water to stabilize the mixture. For example, 20 wt % sodium borohydride solution is stabilized by 45 wt % sodium hydroxide in the commercial reagent to prevent sodium borohydride from hydrolysis during storage. The amount of sodium hydroxide added greatly reduces the gravimetric hydrogen density for the purpose of hydrogen generation and causes environmental and safety issues for disposal of used fuel. In the present invention, the metal hydroxide is part of the fuel and is consumed when the organics are converted to hydrogen.

One preferred embodiment is a water-based composite liquid fuel that contains thermal-balanced hydrogen-rich ingredients and a base. The thermal-balanced ingredients are materials or compounds that release hydrogen in the presence of water in endothermic and exothermic reactions. The dissolved base in the composite liquid fuel serves multiple purposes. One of the purposes is promote the spontaneity of organic reactions. Another purpose is to reduce the thermal needs of organic reactions. Another purpose is to absorb carbon dioxide and ensure hydrogen is the only gaseous product. Another purpose is to serve as a stabilizer (e.g. for borohydride in the presence of water) during storage. Yet another purpose is to control the hydrolysis rate for hydrogen generation and heat generation.

The use of composite liquid fuels to generate hydrogen can be illustrated by the schematic drawing in FIG. 1. The composite liquid fuel 1 is stored in a special designed container or cartridge 2. The composite liquid fuel 1 can be fed into a catalytic or electrocatalytic processor 4 by a pump 3. The fuel processor 4 contains catalysts or electrocatalysts in a specific configuration. When the composite liquid fuel reaches the processor, the exothermic and endothermic reactions take place on a micro or nano scale on the surface of catalysts or electrocatalysts, to enable the efficient heat transfer between these two reactions. The gaseous product, i.e. hydrogen 5, is produced and feeds the hydrogen enabled applications, such as fuel cells. The reaction residue 6 can be pushed back to the container or cartridge 2 in a separate bladder or compartment.

In another embodiment, the composite fuels can be made in a dry or paste form. The exothermic hydride compounds and endothermic organic compounds as well as the hydroxide are mixed together without adding any water, to form a paste or pellets. Specific hydrophobic and hydrophilic polymers are also added into the mixture to enhance mass transfer at the time of usage. Specific catalysts or their precursor salts are added into the mixture in the powder form.

In a preferred embodiment for the dry or paste composite fuels, the hydride compounds range from metal hydrides to borohydrides. The organic compounds are hydrocarbons or oxygenated hydrocarbons, as well as organic salts. The hydrophobic and hydrophilic polymers include polyethylene, polypropylene, polycarbonate poly-tetrafluoroethylene, and the like. The catalysts are carbon, borides, carbides and transition metals, as well as their precursor salts. The hydroxides are alkali or alkaline-earth hydroxides.

In another embodiment of the present invention, no hydroxide is added but compounds able to produce hydroxide are added to the formula. For example, if sodium hydride is added into the dry formula, it produces sodium hydroxide when water is added to the fuel:

$$NaH + H_2O \rightarrow NaOH + H_2 \tag{11}$$

This reaction simultaneously supplies hydroxide, heat and hydrogen at the time hydrogen is needed. This approach also holds for other metal hydrides.

In another embodiment of the present invention, metal alkoxides are used to replace metal hydroxide. When water is added to fuel at the time of application, the metal alkoxides are hydrolyzed into metal hydroxides and corresponding alcohols. The reaction is represented as the follows:

$$M(OR)_x + H_2O \rightarrow M(OH)_x + xROH \tag{12}$$

where M is an alkali or alkaline-earth metal.

Using metal hydrides and metal alkoxides to replace a metal hydroxide greatly increases the hydrogen content of the fuel, and maintains the role of hydroxide to promote endothermic reactions and inhibit exothermic reactions.

Figure 2:
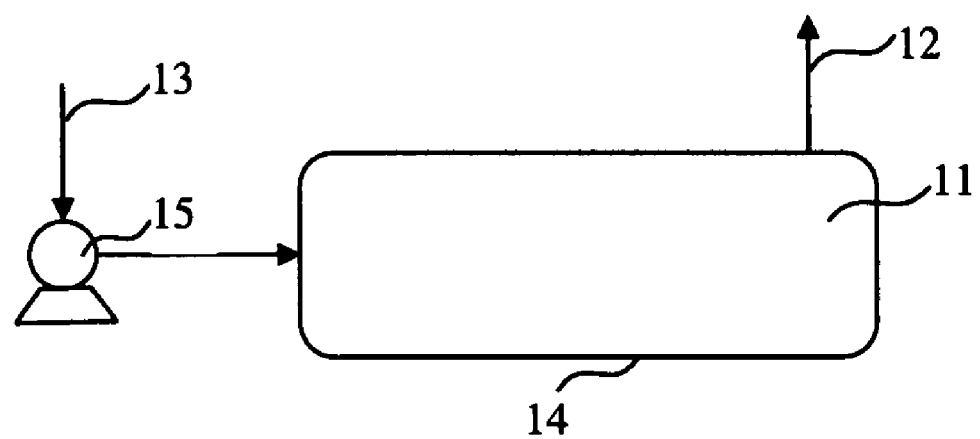
FIG. 2 is a schematic drawing showing hydrogen generation by feeding water into a fuel cartridge with the composite fuel.

In the present invention, the use of this type of dry composite fuel for hydrogen generation can be illustrated by the schematic drawing of FIG. 2. As shown in FIG. 2, the composite fuel 11 is packed into a container 14. When the hydrogen 12 is needed, water 13 is fed into the container 14 by a pump 15 or other feeding mechanism. The hydrogen generation rate and quantity is controlled by the flow rate of water. Since the fuel reaction involves both endothermic and exothermic paths, the temperature of the container is well controlled by the ratio and allocation of materials and there is no risk of runaway. This unique feature is very beneficial for portable applications. The less heat that escapes from the system, the higher the system energy efficiency that can be obtained.

Without intending to limit the scope of the present invention, the composite fuels for hydrogen generation of the present invention may be better understood by referring to the following examples:

Example 1

2 moles of sodium hydroxide were added to purified water to make a 45 wt % NaOH solution. 1 mole of ethylene glycol was then added to the solution to make a composite fuel for hydrogen generation. 0.5 mole of sodium borohydride was slowly added to the alkaline solution. The obtained composite fuel is a clear solution.

Figure 3:
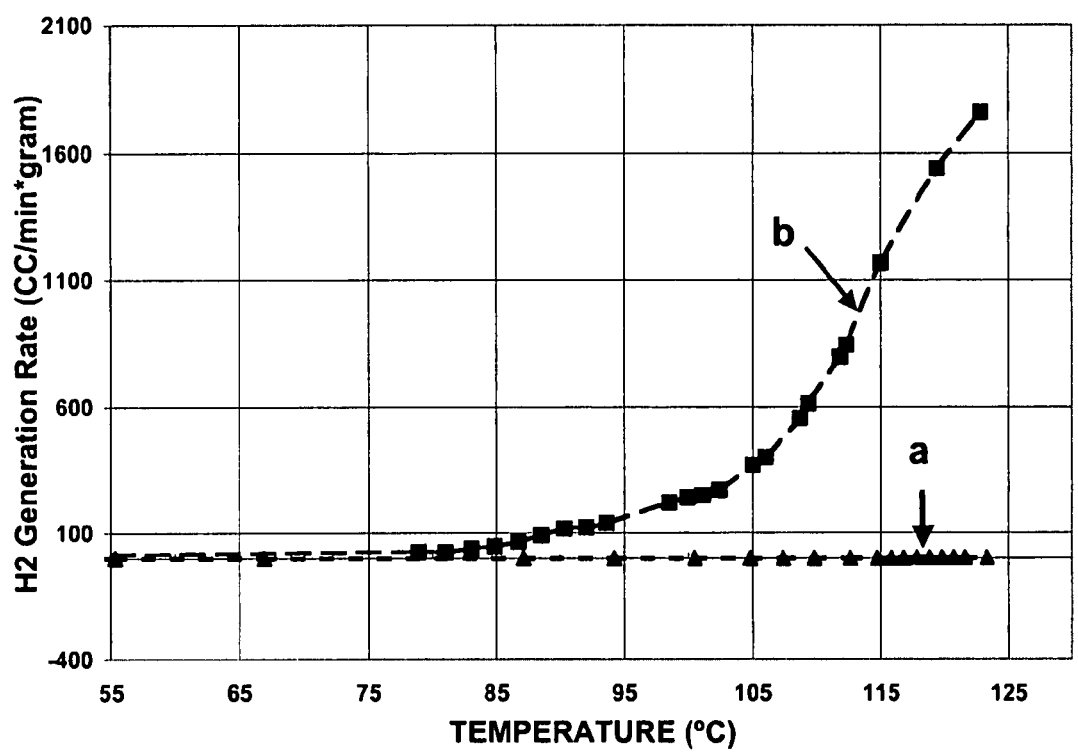
FIG. 3 shows the thermal stability of the composite fuel solution and the hydrogen generation rate at different temperatures in the presence of a catalyst.

This solution is very stable over a wide range of climatic conditions. The fuel cartridge withstood the temperature of a freezer without freezing. The thermal stability of the composite fuel at high temperature was tested in a Teflon container with a heating element. No gas evolving from the solution was observed or measured. The test result of stability of the fuel at high temperature is shown in FIG. 3, line a. This shows that the fuel is stable up to 125° C.

With the same setup but in the presence of carbon supported Pt—Ru catalysts, hydrogen generation is observed and measured. The hydrogen generation rate using this fuel was measured at different temperatures and the results are shown in FIG. 3, line b. The initial hydrogen generation at temperatures below 100° C. is believed to be due to the catalytic hydrolysis of sodium borohydride according to the following equation:

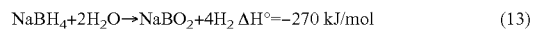
$$NaBH_4 + 2H_2O \rightarrow NaBO_2 + 4H_2 \quad \Delta H° = -270 \text{ kJ/mol} \tag{13}$$

At temperatures above 100° C., hydrogen generation from ethylene glycol takes place based on the following reaction:

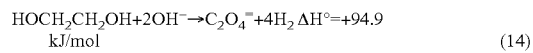
$$HOCH_2CH_2OH + 2OH^- \rightarrow C_2O_4^= + 4H_2 \quad \Delta H° = +94.9 \text{ kJ/mol} \tag{14}$$

Beyond serving as the endothermic fuel to generate hydrogen, using ethylene glycol or other oxygenated hydrocarbons with high boiling temperature has extra benefits towards fuel stability and the vapor pressure of the ingredients, working like antifreeze in a car. The presence of ethylene glycol also helps to reduce the activity of water molecules and makes the sodium borohydride more stable in the composite fuel.

Example 2

By pumping the same composite fuel as in Example 1 into a preheated adiabatic catalytic processor at 150° C. as illustrated in FIG. 1, the hydrogen generation starts once the fuel contacts the catalysts, and the temperature of the processor can be maintained constant during hydrogen generation even with no extra heat input.

Example 3

80 grams of sodium borohydride powder, 80 grams of sodium hydroxide and 5 grams carbon supported Ni, Co and Fe catalyst are well mixed together under a nitrogen atmosphere. Then 62 grams of ethylene glycol is slowly added to the mixture prepared above, and a paste form of composite fuel is formed. The paste is then laminated between 7-mil high porous polyethylene sheets and becomes a pellet. Multiple laminated fuel pellets are packed together into a plastic container. When water is fed into the container, hydrogen is produced. The generation rate of hydrogen is controlled by the feed rate of water.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A composite fuel for hydrogen generation comprising:
   (a) a first fuel that reacts endothermically to generate hydrogen, wherein the first fuel is selected from the group consisting of saturated and unsaturated hydrocarbons and saturated and unsaturated hydrocarbon salts with carbon numbers between 1 and 10;
   (b) a second fuel that reacts exothermically to generate hydrogen; and
   (c) a base.

2. The composite fuel of claim 1, wherein the second fuel is selected from the group consisting of metal hydrides.

3. The composite fuel of claim 2, wherein the metal hydride is selected from the group consisting of alkali metal hydrides and alkaline-earth metal hydrides.

4. The composite fuel of claim 2, wherein the metal hydride is selected from the group consisting of metal hydrides having the formula $M_1M_2H_x$, where $M_1$ is selected from the group consisting of Li, K, and Na, $M_2$ is selected from the group consisting of Al and B, and x is the number of hydrogen atoms.

5. The composite fuel of claim 1, further comprising an oxidizing agent that can be reduced electrochemically or chemically.

6. The composite fuel of claim 5, wherein the oxidizing agent is water.

7. The composite fuel of claim 5, wherein the oxidizing agent produces water.

8. The composite fuel of claim 5, wherein the oxidizing agent is hydrogen peroxide.

9. The composite fuel of claim 1, wherein the base is selected from the group consisting of metal hydroxides and metal alkoxides.

10. The composite fuel of claim 9, wherein the metal hydroxide is selected from the group consisting of alkali metal hydroxides and alkaline-earth metal hydroxides.

11. The composite fuel of claim 10, wherein the metal hydroxides are selected from the group consisting of lithium hydroxide, sodium hydroxide, potassium hydroxide, magnesium hydroxide, and cesium hydroxide.

12. The composite fuel of claim 9, wherein the metal alkoxide is selected from the group consisting of alkoxides having the formula $M(OR)_x$, where M is an alkali metal or an alkaline-earth metal, R is an alkyl group with a carbon number between 1 and 5, and x between 1 and 10.

13. The composite fuel of claim 1, wherein the base is ammonium hydroxide.

14. The composite fuel of claim 1, wherein the fuel components are pre-mixed.

15. The composite fuel of claim 1, wherein at least one of the composite fuel components is produced in-situ from a precursor compound.

16. The composite fuel of claim 1, wherein the composite fuel is a liquid or suspension.

17. The composite fuel of claim 1, wherein the composite fuel is a paste.

18. The composite fuel of claim 1, wherein the composite fuel is in a solid state.

19. A composite fuel for hydrogen generation comprising:
(a) a first fuel that reacts endothermically to generate hydrogen;
(b) a second fuel that reacts exothermically to generate hydrogen; and
(c) a base;
wherein the composite fuel is laminated in or mixed with a polymer.

20. The composite fuel of claim 19, wherein the polymer is in a form selected from the group consisting of porous sheets, powder, beads, fiber and flakes.

21. A composite fuel for hydrogen generation comprising:
(a) a first fuel that reacts endothermically to generate hydrogen;
(b) a second fuel that reacts exothermically to generate hydrogen; and
(c) a base;
wherein the composite fuel is mixed with a supported catalyst.

22. The composite fuel of claim 21, wherein the supported catalyst includes a material selected from the group consisting of the transition metals.

23. The composite fuel of claim 21, wherein the supported catalyst includes a material selected from the group consisting of carbon, graphite, aluminum oxide, titanium oxide, cerium oxide, and zirconium oxide.

24. A composite fuel for hydrogen generation comprising:
(a) a first fuel that reacts endothermically to generate hydrogen;
(b) a second fuel that reacts exothermically to generate hydrogen; and
(c) a base;
wherein the composite fuel is mixed with precursor salts of a catalyst.

25. The composite fuel of claim 24, wherein the precursor salt is selected from the group consisting of inorganic salts and organic salts of the transition metals.

26. The composite fuel of claim 1, wherein the composite fuel is used to generate DC power directly in a fuel-oxidant reagent device selected from the group consisting of fuel-oxidant reagent batteries and fuel-oxidant reagent fuel cells.

27. The composite fuel of claim 26, wherein the fuel-oxidant reagent device includes an oxidant reagent with an electrochemical reduction potential more positive than the composite fuel.

28. The composite fuel of claim 27, wherein the oxidant reagent is selected from the group consisting of air, oxygen, and hydrogen peroxide.

29. The composite fuel of claim 1, wherein the composite fuel is catalytically converted to hydrogen.

30. The composite fuel of claim 1, wherein the composite fuel is electrochemically converted to hydrogen.

* * * * *